US008348318B2

(12) United States Patent
Petiot et al.

(10) Patent No.: US 8,348,318 B2
(45) Date of Patent: Jan. 8, 2013

(54) WOVEN STRAP WITH A VARIABLE WIDTH

(75) Inventors: Philippe Petiot, Saint Chamond (FR); Nicolas Rovri, Talaudiere (FR)

(73) Assignee: Techni Sangles, Saint Chamond (FR)

( * ) Notice: Subject to any disclaimer, the term of this patent is extended or adjusted under 35 U.S.C. 154(b) by 1089 days.

(21) Appl. No.: 11/568,866

(22) PCT Filed: Mar. 16, 2005

(86) PCT No.: PCT/FR2005/050170

§ 371 (c)(1), (2), (4) Date: Jun. 21, 2007

(87) PCT Pub. No.: WO2005/117631

PCT Pub. Date: Dec. 15, 2005

(65) Prior Publication Data

US 2008/0007077 A1 Jan. 10, 2008

(30) Foreign Application Priority Data

May 27, 2004 (FR) ..................................... 04 51049

(51) Int. Cl.
*A45F 5/00* (2006.01)
*A01K 27/00* (2006.01)

(52) U.S. Cl. .......................................... 294/74; 294/149

(58) Field of Classification Search .................... 294/74, 294/149, 150, 156; 24/16 R, 17 B, 17 R, 24/17 AP; 119/795; 139/367 R, 383 R; 428/43
See application file for complete search history.

(56) References Cited

U.S. PATENT DOCUMENTS

| | | | | | |
|---|---|---|---|---|---|
| 4,640,317 | A * | 2/1987 | Chardon et al. | .............. | 139/431 |
| 5,238,279 | A * | 8/1993 | Anteau | .............. | 294/74 |
| 5,592,977 | A * | 1/1997 | Kikuchi et al. | .............. | 294/74 |
| 5,695,234 | A * | 12/1997 | Coticchio et al. | .............. | 294/152 |
| 6,575,201 | B2 * | 6/2003 | Buesgen | .............. | 139/387 R |
| 6,626,132 | B1 * | 9/2003 | Mann | .............. | 119/795 |
| 6,662,753 | B1 * | 12/2003 | Sporn | .............. | 119/797 |
| 7,357,433 | B2 * | 4/2008 | Hess et al. | .............. | 294/74 |
| 7,422,256 | B2 * | 9/2008 | Mueller | .............. | 294/74 |
| 2005/0093317 | A1 | 5/2005 | Hess | | |

FOREIGN PATENT DOCUMENTS

| | | | | |
|---|---|---|---|---|
| DE | 3735241 | | * | 4/1989 |
| DE | 93 08 788 | U1 | | 8/1993 |
| FR | 2 713 097 | A | | 6/1995 |
| GB | 2 191 560 | A | | 12/1987 |
| JP | 401034891 | | * | 2/1989 |
| WO | 03/059462 | A | | 7/2003 |

* cited by examiner

*Primary Examiner* — Paul T Chin

(74) *Attorney, Agent, or Firm* — Heslin Rothenberg Farley & Mesiti P.C.; Victor A. Cardona, Esq.

(57) ABSTRACT

A woven strap comprises at least two continuous parts having different widths, wherein the change in width results from a modification of the respective weave of said parts. The strap can thus be used to create a loop or a ring in order to attach or bear a load. The two ends of the strap are joined to each other by stitching. Only the stitching areas of each of the two ends are tubular. The rest of the ring is flat and the stitching areas are placed on top of each other. The loop or ring can include an integrated wear and tear and/or overload indicator.

16 Claims, 3 Drawing Sheets

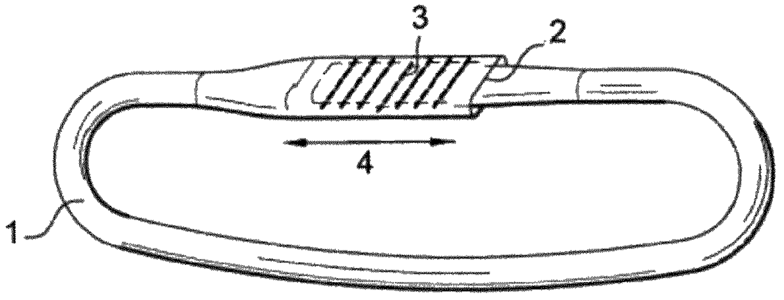
Fig. 4
*(Prior Art)*
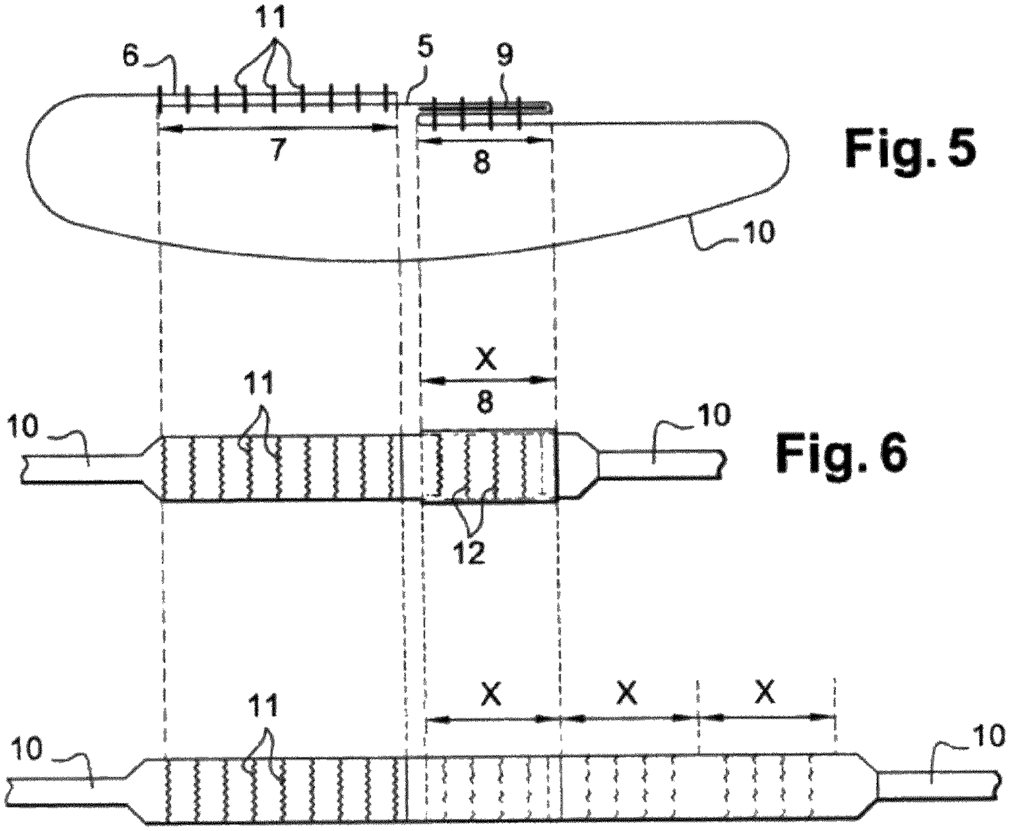
Fig. 5
Fig. 6
Fig. 7

WOVEN STRAP WITH A VARIABLE WIDTH

CROSS REFERENCE TO RELEATED APPLICATIONS

This is a Section 371 filing of International Application No. PCT/FR2005/050170 filed Mar. 16, 20005, and published, in French, as International Publication No. WO 2005/11763 A1 on Dec. 15, 2005, and claims priority of French Application No. 04.51049 filed on May 27, 2004, all of which applications are hereby incorporated by reference herein, in their entirety.

TECHNICAL FIELD

The invention basically relates to a strap obtained by weaving, whereof the primary feature resides in the fact that it has areas of variable widths.

In the rest of the specification, and in the claims, the term "width" means the smallest dimension of the strap in the general plane in which it is inscribed. The term strap should itself be interpreted in its primary acceptance, that is a flat band. In doing so, in the context of the invention, it is important to distinguish between the width of the strap and its thickness, consisting of its dimension in a direction perpendicular to the plane containing the strap.

The invention further relates to products suitable for using such a strap. It also relates primarily to a loop or ring, and in general, any structure closed on itself, prepared from this woven strap and, more particularly, intended for the field of mountaineering and climbing, safety and lifting, and also, in general, for all fields involving a load.

It also relates to leads for animals, straps for musical instruments, bracelets, purely decorative or watch straps, bag handles, etc.

PRIOR ART

In the more specific framework of climbing, the climbers use rings prepared from a strap, generally woven, in particular but repeated situations. This ring is, for example, joined to the shoulder-belt worn by the user and, furthermore, to a snap hook fixed at an appropriate anchoring point. This ring may also serve as a support element for the knees or feet of the user.

In a known manner, such rings must combine both mechanical strength and lightness. Moreover, at least some of them must meet standards, such as in particular standard NF EN 566 "Ring" of April 1997. This states that for a 9 millimeter wide strap ring, the mechanical strength must be greater than or equal to 2,200 daN.

To prepare such a ring, it has been proposed, for example in document WO03/059462, to use a loop consisting of a tubular fabric or mesh provided with two ends, these two ends being joined to each other at a connecting point by the introduction of one of the two ends into the other end, and by stitching said ends at this connecting point.

While from the mechanical standpoint, such a loop or such a ring is likely to meet the prescribed requirements and optionally, those of the standard recalled above, it nevertheless has the following drawbacks:

- firstly, the cost of production of such a loop is encumbered by the labor necessary for its production, insofar as it is necessary to thread one of the ends of the component material into the other, an operation which can only be done manually, and which also requires a certain dexterity;

- secondly, the component material is conventionally produced on looms of a type known per se, and the resulting band is cut at regular intervals corresponding to the desired length of the loop; this cutting is generally performed using a hot blade, which, in addition to the cutting, also seals the tubular fabric or mesh, which must therefore be reopened, to permit the introduction of one of its ends into the other, thereby also representing a time consuming operation.

In the more general field of straps, and in particularly in the context of leads for animals and other gripping handles for bags and baskets, the user usually wishes to enjoy a degree of comfort at the level of the pulling or gripping area. In doing so, it has been proposed to add to these areas elements of a different nature from that of the active area of the lead or the handles. However, here also, such an operation further increases the production costs.

SUMMARY OF THE INVENTION

The invention primarily relates to a strap obtained by weaving, satisfactorily meeting a number of objectives discussed above.

More particularly, the invention relates to a woven strap comprising at least two consecutive or continuous areas or parts of different widths, the modification of said widths being obtained by changing the weave.

The strap according to the invention may also have a plurality of areas of modified width, particularly for a decorative function.

Furthermore, and according to the invention, the strap has a modification of width at one or both of its two ends, reflected by the presence of a tubular structure, also resulting from a change of weave.

In this context, the invention thus relates to a loop or such a ring, suitable for use in the fields considered, and particularly climbing, indeed in any activity using a load, which is simultaneously lightweight, mechanically strong, and relatively easy to prepare in order to reduce the manufacturing costs.

This loop or this ring consists of a strap prepared by weaving, whereof the two ends are joined to each other by stitching.

It is characterized:

- in that limitatively, the stitching areas of each of the two ends are tubular, the rest of the ring being flat.
- and in that said stitching areas are superimposed on one another.

In doing so, considering that only the stitching areas, that is the two ends of the strap making up the loop or ring, are tubular, a significant reduction in weight is achieved.

Advantageously, the length of one of the stitching areas of one of the ends is greater than the other. In doing so, and according to another advantageous feature of the invention, a wear and/or overload indicator is located in the immediate neighborhood of the stitching area. This indicator consists of the folding upon itself of the base of the stitching area thereby forming a triple thickness at this level, followed by stitching of these three thicknesses, said wear and/or overload indicator also being prepared in the tubular part of the strap.

Advantageously, a ribbon is inserted between at least two of the folds of said wear and/or overload indicator. This ribbon is preferably brightly colored compared with the rest of the strap making up the loop or ring, for the obvious purpose of attracting the user's attention upon the breakage of the wear and/or overload indicator.

According to the invention, the stitching of the folds making up the wear and/or overload indicator is carried out using a stitching robot, wherein the respective needle yarn and spool yarn diameters are different.

In this configuration, the tubular area of one of the ends is folded upon itself or at the level of the width change, in order to define a gripping handle.

BRIEF DESCRIPTION OF THE FIGURES

The manner in which the invention can be implemented and the advantages resulting therefrom will appear more clearly from the embodiments that follow, provided for information and nonlimiting, with reference to the figures appended hereto.

FIG. 4 is a schematic perspective view of a ring of the prior art.

FIG. 5 is a schematic representation of the ring of the invention.

FIG. 6 is a flat view of part of the ring of FIG. 5, for particularly illustrating the stitching area.

FIG. 7 is a view similar to that of FIG. 6 with an overload and/or wear indicator after breakage.

DETAILED DESCRIPTION OF THE INVENTION

Figure 1:
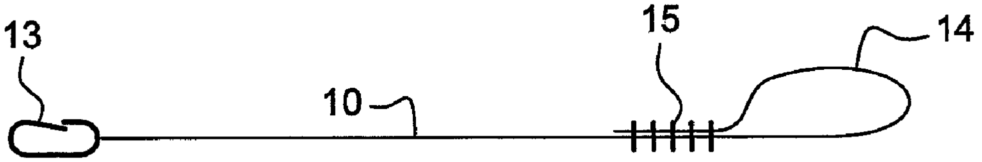
FIG. 1 is a schematic representation of a cross section of a lead for animals, using a strap of the invention.
Figure 2:
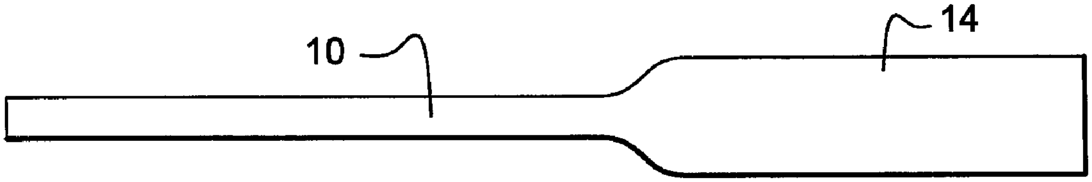
FIG. 2 is a flat view of the strap of FIG. 1.

FIG. 1 therefore illustrates a lead using a strap (10) according to the invention. In this particular case, a snap hook (13) has been materialized at the level of one of the ends, intended in a known manner for the fixing of the lead to the collar, with which the animal is provided, and a handle (14) at the other end.

This handle (14) is produced by the stitching (15) of the strap on itself. A handle incorporated in the strap is thereby obtained.

According to the invention, the area of the strap making up the handle has a different width from the rest of the lead.

The strap (10) is a flat strap. It is prepared on a loom of the type marketed by MULLER (CH). The two distinct areas of the lead, that is the main part, of variable length, and the end constituting the handle (14), are prepared by modifying the weave of the loom. Thus the longer area, separating the two ends, is prepared with a twill weave, whereas the handle area is prepared with a taffeta weave. The reverse configuration is equally feasible.

At the level of the handle (14), a greater width is thereby provided, designed to enhance the user's comfort. Advantageously, the stitching area (15) of the end of the strap on itself occurs at the level of this change in width.

The strap is prepared from any material compatible with the intended application in terms of mechanical strength. Thus, if high mechanical strength is required, for example for a strap used as a bag handle, said material may consist of high tenacity polyethylene, such as, for example, marketed under the registered trademark Dyneema®.

Furthermore, in view of the weaving technique employed, the strap, and hence the product resulting therefrom, is capable of having all types of decoration, such as for example Jacquard. The width may also vary substantially, according to the intended application.

Figure 3:
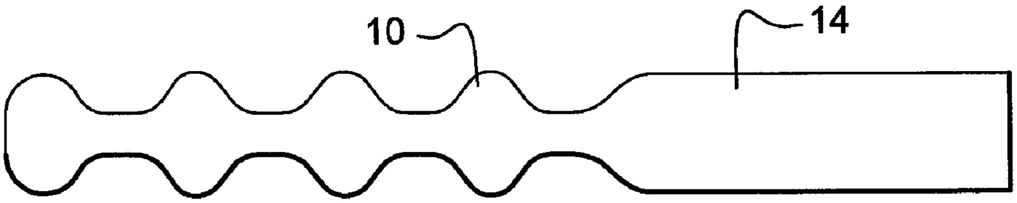
FIG. 3 is a view similar to that of FIG. 2, of another embodiment of the invention.
Figure 8A:
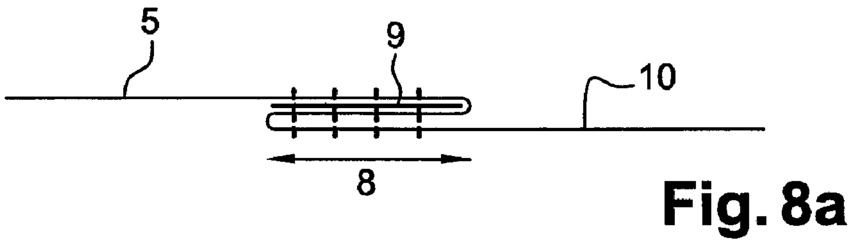
FIGS. 8*a* to 8*d* illustrate the operation of the wear and/or overload indicator of the invention.
Figure 8B:
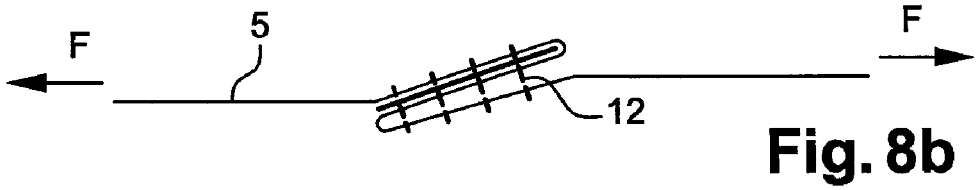
Figure 8C:
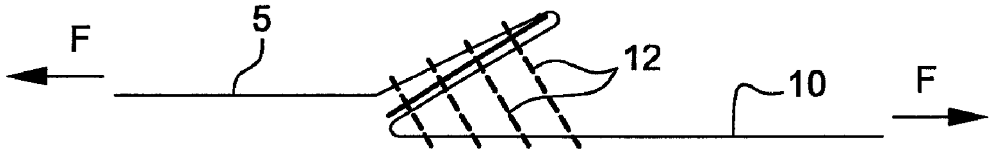
Figure 8D:
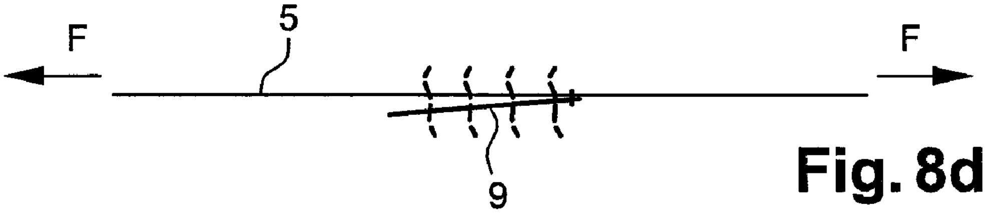

In a different version of the invention, it may even be feasible to arrange, in the main area of the strap, that is between its two ends, a plurality of variations in width, as illustrated in FIG. 3. The technology employed is identical to that previously described, and only the pitch of the weave variations is different.

Alternatively, the variation in width of the strap also results from the passage from flat mode to tubular mode. Thus the handle consists of a tubular part. In doing so, the thickness of the strap is increased at this level, optimizing the feeling of comfort.

For this purpose, during the manufacturing phase with twill weave, to prepare the flat area of the strap, the warp yarns work side by side in pairs, while with a taffeta weave, to prepare the tubular area, said warp yarns become individualized, specifically to permit the production of such a tubular area.

As may have been understood, the strap of the invention can be prepared continuously, with periodic change of weave, to produce flat areas of variable width, or alternating flat areas and tubular areas. The band thereby prepared is also cut automatically using a heated blade, incidentally causing the sealing of the component yarns, for example, polyethylene. As may be imagined, in the presence of tubular areas, this cutting area limitatively occurs at the level of said tubular areas, so that the latter are systemically blocked due to the heating of the yarns.

These various embodiments are therefore suitable for implementation for the preparation of various products, such as leads for animals, collars, handles for bags and other baskets, bracelets, watch straps, straps for musical instruments, such as guitar, accordion, etc.

One particular application of the present invention relates to rings and other loops in the areas of safety, lifting, mountaineering and climbing, and in general, in all areas involving a load.

Thus, in relation to FIG. 4, a loop or ring has been shown, more particularly intended for climbing according to the prior art. This loop or ring comprises a tubular strap (1) prepared by weaving, of which the two ends (2, 3) are joined to each other by the introduction, in the example described, of the end (2) into the end (3), followed by stitching of the stitching area (4) thereby defined. This introduction is made possible by the tubular nature of the strap (1).

It may be understood, considering the tubular nature of the strap (1), that this stitch is therefore made on four thicknesses.

The particular application of the invention to this field is more particularly described in relation to the following figures and, in general, to FIG. 5. According to the invention, the strap (10) used to prepare the loop or ring of the invention is a flat strap, whereof only the ends (5, 6) are tubular. According to the invention, the strap (10) is therefore not tubular between its ends. It thus has a reduced width at this level, and, for example, in the illustration described, a width of 9 millimeters, whereas the width of the stitching area is typically 15 millimeters.

This strap (10) is also produced on a loom of the type marketed by MULLER (CH). The three distinct areas of the ring, that is the central band and the two ends, are prepared by modifying the weave of the loom. Thus the longer area, separating the two ends (5, 6), is prepared with a twill weave, whereas the tubular areas, corresponding to the two ends, are prepared with a taffeta weave.

During the phase of manufacture with twill weave, the warp yarns work side by side in pairs, whereas with the taffeta weave, said warp yarns are individualized, specifically for preparing a tubular area. This tubular area is wider, as may be observed in FIGS. 6 and 7.

According to the invention, the strap is prepared from high tenacity polyethylene, like the material marketed under the registered trademark Dyneema®. This material has mechanical properties compatible with the use of the ring in question.

According to the invention, the two ends (5, 6) of the strap (10) are joined to each other by stitching by superimposing them upon one another. Four thicknesses are accordingly provided at this level, that is two thicknesses for each of the ends, the number of these thicknesses being inherent in the tubular nature of the strap at this level, and at this level only.

The stitching is carried out, for example, on stitching robots operating in (X, Y), of the type marketed by JUKI. Such a robot is suitable particularly for obtaining a number of stitching lines (11), substantially parallel to each other, and further describing an alternation of broken lines or "zigzags". In the example described, the stitching area (7) comprises nine of these stitching lines. At this level, the diameter of the needle yarn of the stitching robot is equal to the diameter of the spool of said robot. The type of yarn is, for example, polyamide (nylon). It is suitable for conferring on the ring resulting from the closure of the strap thus prepared, a mechanical strength higher than or equal to 2,200 daN for a nominal strap width of 9 mm in the inter-end area, and 15 mm for the ends, that is, at the level of the stitching area (7), that is according to standard NF EN 566.

As already stated, the strap making up the ring of the invention is prepared on looms of a type known per se. Accordingly, it is prepared continuously, with periodic change of weave, to produce the flat areas and the tubular areas. The band thus prepared is also cut automatically, using a heated blade, incidentally causing the sealing of the component yarns of polyethylene. As may be understood, this cutting area limitatively occurs at the level of the tubular areas, so that the latter are systematically blocked by the heating of the yarns. However, this blocking has no effect, particularly in terms of labor and hence in terms of cost, because contrary to the prior art, there is no introduction of one of the ends into the other, but a superimposition of said ends.

According to one feature of this particular form of the invention, the ring is also provided with a wear and/or overload indicator (8). This is arranged at one (5) of the two ends of the strap (10). For this purpose, the tubular area of the end (5) has a greater length than the tubular area of the end (6), specifically to permit the production of this wear and/or overload indicator.

This is prepared by folding in three thicknesses at the base of said end (5) of the strap (10), as may be observed particularly in FIG. 5. It extends along a length X.

After folding, therefore arranged flat, like the stitching area in (7) previously described, this area (8) is stitched, also using a stitching robot, for example of the JUKI type, following the same principle of a succession of stitching lines (12), substantially parallel to each other and forming zigzags.

However, for the preparation of this wear and/or overload indicator, the diameter of the needle yarn is different from the diameter of the spool yarn of said robot. In the present case, a smaller diameter is selected for the spool yarn compared with the diameter of the needle yarn. Furthermore, the number of stitching lines (12), without regard to the type of stitching yarn, depends on the value at which the overload and/or wear indicator is intended to break. Thus, this tripping or this breakage will occur when the spool yarns, forming loops after the actual stitching operation, will break due to their smaller diameter than that of the loops prepared by the needle yarn, and closed on said spool yarn loops in case of overload, or when the stitching yarns become worn out by repeated friction of the ring, and hence of the indicator (8) area, on rocks in particular.

When the wear and/or overload indicator has played its role, it extends along a length of 3× (FIG. 7).

The various steps of tripping of the wear and/or overload indicator are shown in relation to FIGS. **8*a* to 8*d*** with:

FIG. **8*a***: state of indicator at rest,

FIG. **8*b***: incipient deformation of the indicator by pulling,

FIG. **8*c***: end of deformation and breakage of the stitching yarn,

And finally, FIG. **8*d***: breakage of the indicator with elongation of the ring by twice the respective length X of the indicator, due to the manner in which it is prepared.

Despite the effective breakage of the indicator (8) the ring or loop preserves a mechanical strength greater than or equal to its nominal value and in the example described, greater than or equal to 2,200 daN. In fact, this breakage does not affect the actual stitching area (7) on the one hand, because the stitching yarns of this area (needle and spool) have the same diameter, and on the other, the number of stitching lines (11) at this level is greater than the number of stitching lines (12) of the indicator (8). Furthermore, since this breakage is likely to occur only at a tubular area of the strap, it does not disorganize the intrinsic structure inherent in the weaving mode, because only the stitching yarns are concerned.

Advantageously, the interior of one or the other of the fold areas of the wear and/or overload indicator is provided with a ribbon (9) advantageously colored, for the purpose of attracting the attention of the user of the ring when said indicator actually breaks. This ring is simply stitched, for example by running straight stitches on the back and front of the strap, obviously directly at the actual indicator (8) area.

The value of the ring or loop of the invention is clearly understandable, due to its ease of production, incurring no excessive loss of time, and hence, unlikely to encumber the manufacturing cost, and also due to the use of such a wear and/or overload indicator, optimizing the conditions of safety and use of such a ring.

And in general, it is easy to understand the value of the strap of the invention, which, in a relatively simple and automated manner, provides the availability of an element that can be varied virtually to infinity, both in terms of dimensions and in terms of decoration, for any use involving a pulling or a lifting function, or even a simply decorative function, while optimizing the user's comfort.

The invention claimed is:

1. A woven strap comprising:

a first part connected to a second part, said first part and said second part having different widths relative to each other, said first part and said second part each consisting of a single layer flat thickness, said first part having a first weave and said second part having a second weave, wherein said first weave and said second weave are different weaves relative to each other and have different widths relative to each other.

2. The woven strap as claimed in claim 1, comprising a plurality of areas having modified width.

3. The woven strap as claimed in claim 1, wherein the strap is flat, and at least one of two ends of the strap is tubular.

4. The strap as claimed in claim 1 further comprising means for connecting the strap to an animal such that the strap comprises a leash.

5. The strap as claimed in claim 1 wherein the strap is configured as a collar or bracelet.

6. The strap as claimed in claim 1 wherein the strap is configured as a gripping handle of a bag or basket.

7. The strap of claim 1, further comprising a longitudinal axis of said first part and said second part, said first part and said second part being longitudinally spaced relative to each other along said longitudinal axis.

8. The strap of claim 7 wherein a first longitudinal end of said first part is connected to a second longitudinal end of said second part.

9. A loop or a ring for attaching or bearing a load, comprising:

a strap prepared by weaving, said strap having two ends joined to each other by stitching, wherein:

stitching areas of each of the two ends are tubular prior to being connected to each other and said stitching areas each have a width larger than a width of a rest of the loop or ring, said rest of the loop or ring being non-tubular and consisting of a single layer flat thickness;

and said stitching areas are superimposed on one another to connect said two ends to each other by stitching such that said stitching areas comprise flattened tubular areas.

10. The loop or ring for attaching or bearing a load as claimed in claim 9, wherein length of one of the stitching areas of one of the ends is greater than a length of a stitching area of a second of the ends.

11. The loop or ring for attaching or bearing a load as claimed in claim 9, further comprising a wear or overload indicator arranged at one of the two tubular stitching areas of the loop or ring.

12. The loop or ring for attaching or bearing a load as claimed in claim 11, wherein the wear or overload indicator comprises a triple thickness of folds formed by folding upon itself of one of the ends followed by stitching of the folds.

13. The loop or ring for attaching or bearing a load as claimed in claim 12, wherein a ribbon is inserted between at least two of the folds of said wear or overload indicator.

14. The loop or ring for attaching or bearing a load as claimed in claim 13, wherein the ribbon is brightly colored compared with the rest of the loop or ring, for drawing a user's attention upon breakage of the wear or overload indicator.

15. The loop or ring for attaching or bearing a load as claimed in claim 12, wherein the stitching of the folds making up the wear or overload indicator uses needle yarns and spool yarns, of respective different diameters.

16. The loop or ring for attaching or bearing a load as claimed in claim 15, wherein diameter of the spool yarns is smaller than diameter of the needle yarns.

* * * * *